United States Patent [19]

Lane et al.

[11] Patent Number: 4,525,989
[45] Date of Patent: Jul. 2, 1985

[54] FLOATING FOOT SHIELD FOR WALK-BEHIND MOWER WITH SULKY

[75] Inventors: Joseph J. Lane; Joseph E. Scanland, both of Savannah, Ga.

[73] Assignee: Roper Corporation, Kankakee, Ill.

[21] Appl. No.: 518,818

[22] Filed: Aug. 1, 1983

[51] Int. Cl.³ .................. A01D 53/08; A01D 53/00
[52] U.S. Cl. .................................. 56/17.4; 56/320.1
[58] Field of Search ............... 56/17.4, 16.7, 320.1, 56/16.9, DIG. 20, DIG. 24; 280/32.7

[56] References Cited

U.S. PATENT DOCUMENTS

| 2,514,407 | 7/1950 | May . | |
| 2,919,756 | 1/1960 | Knipe | 280/32.7 |
| 2,929,186 | 3/1960 | Bundy | 56/17.4 |
| 2,977,739 | 4/1961 | Lustyan | 56/17.4 |
| 3,032,957 | 5/1962 | Boyer . | |
| 3,465,505 | 9/1969 | Krinke . | |
| 4,172,351 | 10/1979 | Scanland | 56/320.1 |
| 4,300,334 | 11/1981 | Hines | 56/17.4 |

FOREIGN PATENT DOCUMENTS

| 34188 | 3/1965 | Finland | 56/17.4 |
| 2054333 | 2/1981 | United Kingdom | 56/320.1 |

Primary Examiner—Gene Mancene
Assistant Examiner—John G. Weiss
Attorney, Agent, or Firm—Dennis R. Schlemmer; David J. Richter

[57] ABSTRACT

A walk-behind lawn mower having a deck with adjustably mounted ground-engaging wheels. A side shield is provided in the form of a metal rod extending longitudinally along one side of the deck approximately following the curvature of the deck and lying between ground level and the lower edge of the deck side wall. To permit vertical movement of the side shield upon encountering minor irregularities in the ground, the rearward end of the side shield is pivotally attached to the rear wheel axle. To permit horizontal movement of the side shield to provide for lost motion upon adjustment of the deck height, the mower deck includes a bracket adjacent to and rearward from the front wheel and the foreward end of the side shield terminates in an upwardly extending portion which extends through a longitudinally extending slot in the bracket.

15 Claims, 5 Drawing Figures

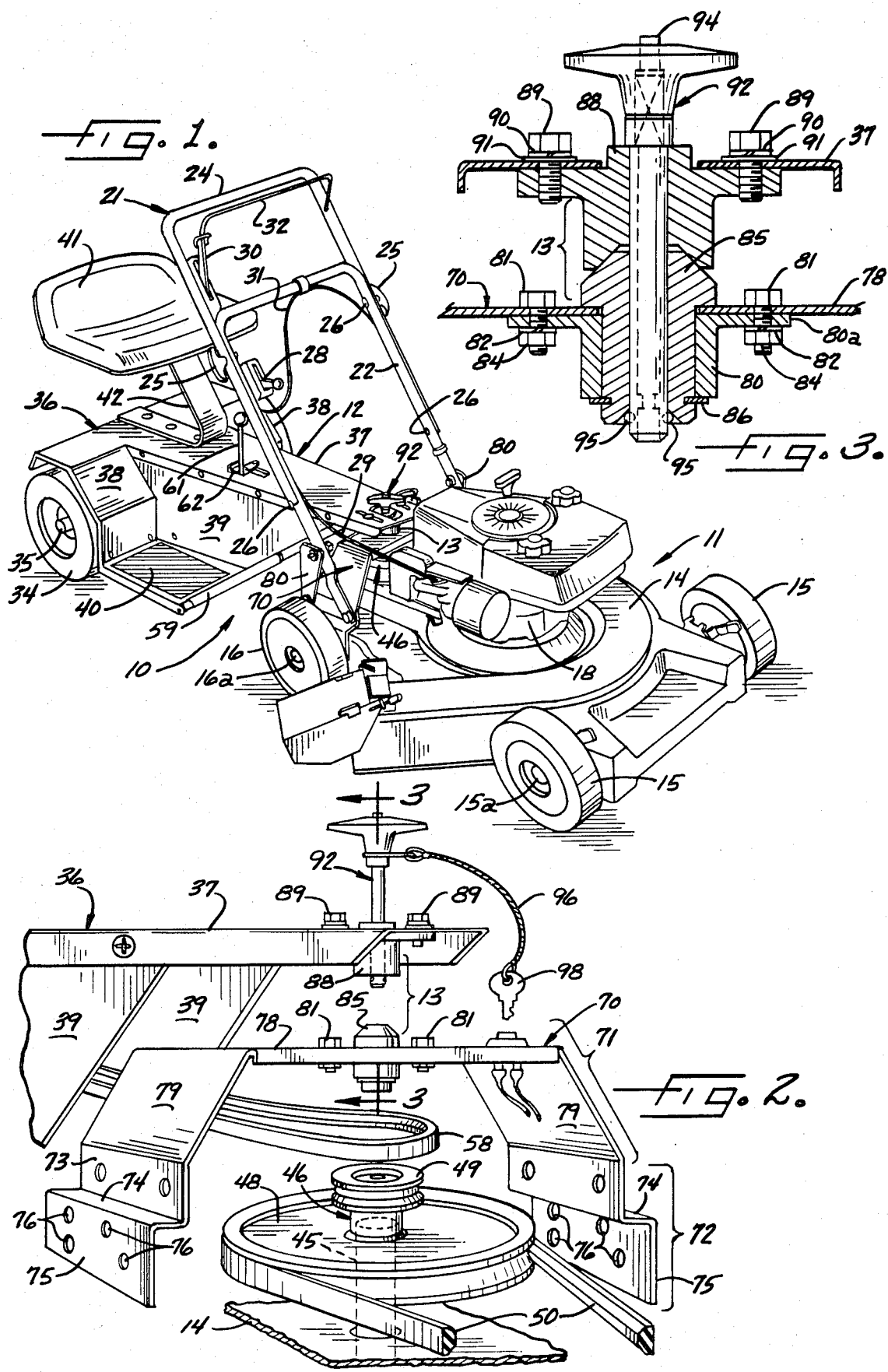

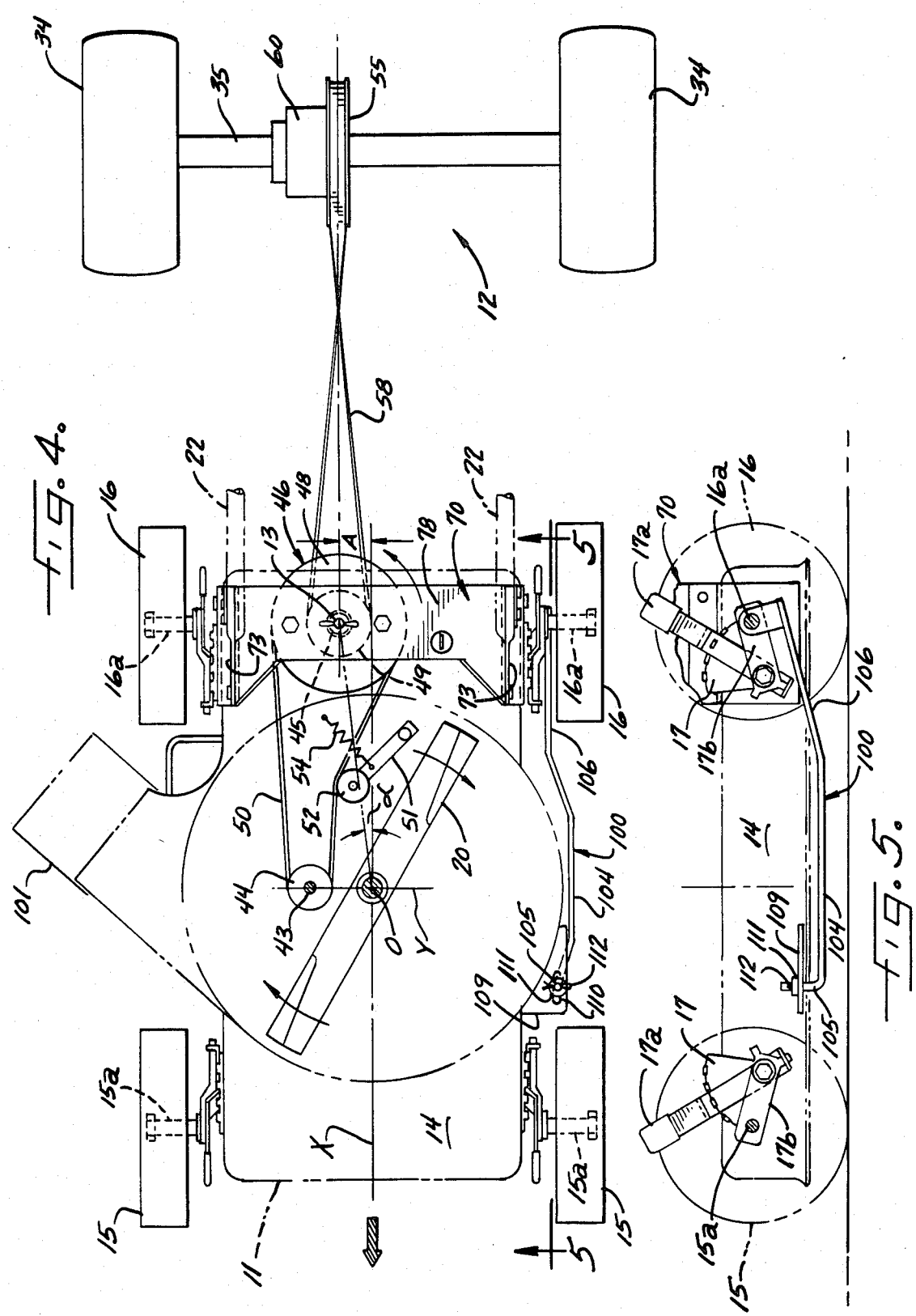

FLOATING FOOT SHIELD FOR WALK-BEHIND MOWER WITH SULKY

DESCRIPTION OF THE INVENTION

The present invention relates to power-operated lawn mowing machines, and more particularly, to articulated riding mowers of the type that include a walk-behind push mower.

For persons with large lawns riding mowers are commonly used to reduce both the amount of time and effort required for mowing. Riding mowers, however, are relatively expensive. Moreover, although riding mowers are quite efficient for mowing open areas of the lawn, they frequently are not easily maneuverable about obstacles, such as trees, bushes, fences and the like. When a lawn includes many such obstacles, a person will often utilize a walk-behind push mower to mow around them, such mowers being more maneuverable in tight spaces than a typical riding mower, while using a riding mower on the remainder of the lawn.

In order to provide a single relatively inexpensive mower suitable for both riding, to mow large open areas, and for walk-behind manipulation, to mow around obstacles, it is known to provide a walk-behind mower with a detachable wheel-supported sulky unit disposed rearwardly and pivotally attached to the walk-behind mower. This provides a highly-maneuverable articulated riding mower, with the steering of this mower being effected by manipulation of the handle on the forward unit to pivot the forward unit. The rotary power source on the push mower which drives the mower blade also drives a power take-off which, through suitable transmission means, rotatably drives the wheels of the sulky unit.

Due to the relatively simple power transmission means utilized in such articulated riding mowers, it is common that wheels of the sulky unit are capable of being driven only so that the riding mower will travel in a forward direction. In the course of maneuvering the mower, it is not uncommon for the operator to desire to travel in a reverse direction. In such situations, the operator, while remaining seated on the sulky, will disengage the clutch to put the riding mower in neutral. The operator then will typically place his feet on the ground and push backwards with his legs to reverse the direction of the mower. If the operator's feet should slip while pushing the mower backwards, it is possible that his feet could slide under the mower housing and be exposed to the rotating mower blade, creating an unsafe condition.

It has been known to provide mowers with guards or shields which effectively extend the lower edge of the mower deck to ground level, thus providing a relatively effective barrier between the operator's feet and the mower blade. Such shields function satisfactorily when the surface being mowed is relatively smooth and level. However, lawns frequently contain irregularities such as bumps or dips which, when such irregularities are encountered by the mower, can result in either grounding the mower housing or exposing blade. Further, because such shields are typically rigidly attached to the mower housing, when the wheel heights of the mower are changed to adjust the blade height, adjusting the shield height frequently consumes a sufficient amount of time to discourage the operator from making the corresponding adjustment of the shield, thus greatly detracting from the shield's efficacy.

Thus, it is an object of the present invention to provide a foot shield for use in a walk-behind mower, and particularly a walk-behind mower having a rearward sulky attachment, for preventing the feet of the operator from sliding under the mower housing when the mower is pulled in a reverse direction.

Another object is to provide such a foot shield which will effectively function even when irregularities in the mowing surface are encountered.

A further object is to provide such a foot shield which adjusts automatically to take into account adjustments in the height of the mower wheels.

Other objects and advantages of the invention will become apparent upon reading the following detailed description and upon reference to the drawings, in which:

FIG. 1 is a perspective of an illustrative articulated riding mower embodying the present invention;

FIG. 2 is an enlarged fragmentary, exploded perspective showing the means for attaching the sulky to the walk-behind mower and the power transmission means for driving the sulky;

FIG. 3 is a vertical section taken in the plane of line 3—3 in FIG. 2;

FIG. 4 is a plan view of the illustrated riding mower showing the power transmission means for driving the sulky and the location of the attachment point of the sulky to the walk-behind mower; and FIG. 5 is a vertical section taken in the plane of line 5—5 of FIG. 4.

While the invention is susceptible of various modifications and alternative constructions, a certain illustrated embodiment thereof has been shown in the drawings and will be described below in detail. It should be understood, however, that there is no intention to limit the invention to specific forms disclosed, but on the contrary, the invention is to cover all modifications, alternative constructions and equivalents falling within the spirit and scope of the invention.

Referring now more particularly to the drawings, there is shown an illustrative articulated riding mower 10 embodying the present invention comprising a conventional walk-behind mower 11 with a sulky unit 12 detachably connected thereto by means of a pivotal connector 13. The walk-behind mower 11 includes a mower deck 14 having an inverted pan-shaped housing defining a central space, the mower deck being supported for rolling movement by two pairs of ground-engaging wheels 15, 16 located at the front and rear corner positions of the deck and mounted on axles 15a and 16a, respectively. Mounted on the top of the deck 14 is a rotary power source 18, typically a 4-cycle gasoline-powered internal combustion engine of about 5 horsepower. The engine 18 includes a shaft 19 (FIG. 4) extending into the central space of the housing and having a cutting blade 20 mounted on the lower end thereof. To adjust the riding height of the mower deck 14, and thus the height of the cutting blade 20 above the ground, wheel adjusting brackets 17 are interposed between the wheels 15, 16 and the mower deck 14. Each bracket 17 includes a cooperating height adjusting lever 17a and an axle arm 17b for carrying the wheel axle, which function in a manner to change the position of the wheel axles.

For guiding the walk-behind mower, a handle 21 is secured to the mower deck 14 adjacent the rear wheels 16 and extends upwardly and rearwardly therefrom. The handle 21 comprises a lower portion 22 and an upper portion 24 which when the walk-behind mower 11 is being used in conjunction with the detachable sulky 12, are secured together as shown in FIG. 1 by the handle knobs 25 and shoulder bolts 26. Construction of the handle 21 in two portions facilitates the extension of the handle when the walk-behind mower 11 is used as a push mower. In the illustrated mower, the lower handle 22 carries an engine throttle control 28 and its cooperating cable 29 for selectively controlling the speed of the engine 18, while the upper handle 24 supports a control 30 and associated cable 31 for selectively engaging an appropriate blade clutch and blade brake (not shown). The control 30, preferably is a "dead-man's" control of a known type, and is biased to disengage the brake clutch and apply the blade brake if no external force is applied to the control. To engage the blade clutch and rotate the blade 20, a control bar 32 associated with the control 30 must be depressed so as to lie alongside the cross bar of the upper handle 24.

The sulky unit 12 is pivotally attached in rearwardly extending relation to the walk-behind mower 11. The sulky 12 is supported for rolling movement by a pair of ground wheels 34 mounted on an axle 35 and includes a frame, generally designated 36, comprising a top support plate 37, fenders 38, side plates 39 and foot rests 40. An operator's seat 41 is secured to the frame 36 by means of a resilient bracket 42.

In order to propel the wheels of the sulky 34 when used as part of the riding mower, power transmission means are provided between the engine 18 and the sulky axle 35. The engine 18 rotatably drives a power take-off shaft 43 (FIG. 4) which carries a pulley 44. Mounted in upstanding relation to the mower deck between the rear wheels 16 is a vertical jackshaft 45 which rotatably supports a unitary dual pulley assembly 46 having a relatively large primary or input pulley 48 and a smaller secondary or output pulley 49, both disposed in horizontal planes for rotation about the vertical jackshaft axis. A primary drive V-belt 50 operatively connects the power take-off pulley 45 with the primary pulley 48. To ensure that the primary drive belt 50 does not slip with respect to its associated pulleys, a backside idler pivotally mounted on the mower deck 14 includes an idler arm 51 having an idler pulley 52 mounted for rotation on the end thereof. The idler arm 51 is biased by a spring 54 so that the idler pulley 52 exerts a force on the primary drive belt 50 of a sufficient magnitude to maintain the drive belt 50 in tension to engage the pulleys 45, 48 and prevent slippage.

The secondary pulley 49 is operatively connected to a pulley 55 on the sulky axle 35 by means of a secondary or sulky drive V-belt 58. As seen in FIG. 4, the sulky drive belt 58 is twisted 90° in order to engage both the horizontally disposed secondary pulley 49 and the vertically disposed sulky pulley 55. To selectively drive the sulky wheels 34, an idler arm and pulley arrangement (not shown) similar to the backside idler discussed above may be provided. As will be apparent, the operator may selectively tension the sulky drive belt 58 with such an idler pulley arrangement by means of an appropriate foot-actuated clutch pedal 59 operatively connected to the idler arm and hinged to the forward end of the foot rest 40. For stopping the riding mower, the axle 35 may include a brake drum 60 about which a brake band (not shown) is disposed. As again will be apparent, such brake band can be selectively tensioned by means of an appropriate brake lever 61 which extends upwardly through the top plate 37 of the sulky frame 36 so as to be readily accessible to the operator. The brake lever 61 may be locked in place by means of a keeper 62 which is pivotally mounted to the top plate 37, thus permitting the brake to be used as a parking brake.

To reduce the concentration of forces in the mower deck 14 due to attaching the sulky 12 to the walk-behind mower 11, the mower deck 14 is provided with a bridge support to which the sulky support 37 is pivotally connected. As best seen in FIGS. 1 and 2, the bridge support 70 includes a central portion 71 which overrides the rear apron of the mower deck 14 and extends horizontally between the rear corner positions of the deck overlying the unitary pulley assembly 46 of the power transmission means. The bridge support 70 has integrally-formed downward extensions 72 with first vertically depending sections 73, outwardly depending sections 74, and second vertically depending sections 75. The second vertically depending sections 75 correspond to the rear corner positions of the mower deck and are rigidly fastened thereto by means of bolts which extend through apertures 76 in the sections 75 and cooperating apertures in the mower deck. The rear wheels 16 are also carried by the sections 75, thus transferring much of the sulky reactive force directly from the sulky, through the support and to the wheels, thus minimizing the force exerted on the mower deck. In the illustrative bridge support 70, the central portion 71 carries the pivotal connecter 13 and also includes a horizontal middle section 78 and inclined transition sections 79 intermediate of the middle section and the downward extensions 72.

To reduce the amount of forces developed in the mower deck 14 incident to steering the mower in either its walk-behind or riding mode, the lower end of the handle 21 is connected directly to the bridge support 70 so that such forces developed in the handle incident to guiding the mower are transferred directly to the bridge support and thence to the wheels, thus bypassing the mower deck. To this end, the lower end of the lower handle 22 is bolted to the first vertically depending section 73 of the bridge support 70, with a handle brace 80 being interposed between each end of the lower handle 22 and the bridge support 70 to provide for adjustment of the angle the handle makes with respect to the mower deck, as well as insuring a rigid connection of the handle to the bridge support.

For pivotally attaching the sulky 12 to the bridge support 70 of the walk-behind mower 11, the central portion 71 of the bridge support 70 includes a bearing which cooperates with a pin assembly on the top support plate 37 of the sulky 12. Referring more specifically to FIG. 3, a bearing 80 is mounted to the horizontal middle section 78 of the bridge support 70 through its integral flange 80a by means of two bolts, flat washers and lock nuts, 81, 82 and 84 respectively. The bearing 80 supports a spacer 85 having a bore therethrough and secured to the bearing 80 by means of an E-ring 86. The top plate 37 of the sulky 12 includes a bracket assembly 88 secured thereto by two bolts, lock washers and flat washers 89, 90 and 91 respectively. The bracket assembly 88 has a bore therethrough which aligns with the bore in the spacer 85 to allow the insertion of a pin assembly 92 therethrough. The pin assembly includes a spring-loaded plunger 94 and ball detents 95 which cooperate in a well-known manner to pivotally secure the sulky 12 to the bridge support 70. In the illustrated embodiment, the pin assembly also carries, by means of a lanyard 96, an ignition key 98 needed for starting the mower.

As a consequence of the secondary or output pulley 49 rotating in a horizontal plane about a vertical axis, it has been found that the sulky drive belt 58 will exert a moment on the forward, walk-behind mower 11 in a direction opposite to the rotation of the secondary pulley. Specifically, in the illustrated embodiment, when the secondary pulley 49 rotates in a counterclockwise direction, as viewed in FIG. 4, the sulky drive belt 58 exerts a clockwise reaction moment on the walk-behind mower 11 about the axis of the jackshaft 45, tending to turn the mower to the right, when viewed from behind the mower.

To neutralize the turning movement, the vertical axis of the pivotal connection 13 between the walk-behind mower 11 and the sulky 12 is laterally offset from the longitudinal centerline of the walk-behind mower so that the reactive force exerted on the walk-behind mower through the pivotal connector by the propelled sulky counteracts the turning moment generated by the rotating secondary pulley to allow the riding mower, even when unguided by an operator, to travel in a substantially straight line. Referring to FIG. 4, the front and rear wheels 15, 16 define a longitudinal centerline X, which the bridge support 70 overlies, and a transverse centerline Y. These centerlines X, Y intersect at an origin O which, in the illustrated mower, is coincident with the vertical axis of the engine shaft 19. As the secondary pulley 49 in the illustrated mower rotates in a counterclockwise direction, the reactive moment is clockwise about the jackshaft axis. Thus, the vertical axis of the pivotal connector 13 is disposed, when viewed from above and behind the mower, to the right of the longitudinal centerline X by an angle α, which is measured from the origin O with respect to longitudinal center line X, creating an offset from the centerline of a distance A. In practice, when the walk-behind mower 11 is a 21 inch rotary mower, a minimum angle α of at least two degrees, resulting in an offset A of about one-half inch, is required for producing a satisfactory counteracting moment. Best results have been obtained where the angle α is between 2½ to 4½ degrees, with the preferred angle α being 3½ degrees, resulting in an offset A of approximately ¾ inch. It is appreciated that if the output pulley rotates in a clockwise direction, a counterclockwise moment would be produced and the vertical axis of pivot connector 13 would be offset to the left side of the longitudinal center line X in order for the propelled sulky to create a counteracting moment.

To prevent the sulky drive belt 58 from being unduly streched or relaxed during pivoting of the walk-behind mower 11 relative to the sulky 12, the vertical axis of the output pulley 49 is located on the mower deck 14 so as to be coincident with the vertical axis of the pivotal connector 13. Such undue stretching or relaxing of the sulky drive belt 58 would otherwise occur as the distance between the point on the sulky axle 35 to which the pulley 55 is attached and the vertical axis of the secondary pulley 49 would vary as the articulated mower is steered between straight and curved paths.

Since the illustrated riding mower is propelled only in the forward direction, in order to travel in reverse, the operator must disengage the forward drive of the sulky, and then push with his feet, as previously noted. In accordance with the instant invention, a floating foot shield is provided which lies between the bottom edge of the mower deck and ground level to prevent the operator's feet from sliding under the side of the mower deck. The side shield automatically compensates for minor irregularities in the surface to be mowed and also adjusts automatically with the adjustment of the height of the mower deck above the ground. Referring to FIGS. 5 and 6, a side shield 100 comprising a metal bar is associated with the lefthand or non-discharge side of the illustrated walk-behind mower. The side shield 100 extends fore and aft along the lefthand side of the mower generally following the curvature of the deck and hanging from the housing between ground level and the lower edge of the deck side wall.

The illustrated side shield 100 has a substantially horizontal central portion 104, an upwardly extending forward end 105 and an upwardly extending rearward end 106. To allow for vertical movement of the side shield 100 when minor irregularities in the mowing surface are encountered, the rearward end 106 is pivotally attached to the axle 16a of the rear wheel 16 by means of an integral bracket 108 having an operature therein through which the axle extends. The upwardly extending end 105 passes through a bracket 109 integral with the side wall of the mower deck adjacent to and rearward from the front wheel 15. The forward end 105 extends through a slot 110 in the mounting bracket 109. To permit free movement of the forward end 105 of the side shield, the slot 110 is of a width greater than the thickness of the upwardly extending end 105 of the side shield. To prevent the withdrawal of the end through the slot, the end 105 includes a collar 111 and cotter pin 112. To allow for the changing distance or "lost motion" between the rear wheel axle 16a and the mounting bracket 109 when the height of the rear wheel is adjusted, the slot 110 extends in the fore and aft direction. The side shield 100 can thus adjust for lost motion by sliding horizontally in the slot 110.

In operation, upon encountering a protrusion or the like in the mowing surface, the side shield 100 will pivot about the wheel axis 16a and the forward end 105 of the side shield 100 will travel upward through the slot 110 in the mounting bracket 109. If a dip should be encountered, the side shield 100 will pivot downwardly until either the ground is encountered or the collar 111 and cotter pin 112 act to prevent further withdrawal of the forward end 105 through the slot 110 in the mounting bracket 109. It will be apparent that at all times, whether mowing a flat and level surface or an irregular surface, the foot shield acts to provide an effective barrier between the operator's feet and the mower blade.

From the foregoing, it can be seen that the articulated riding mower of the present invention is adapted for relatively easy usage and longer life than heretofore provided by previous articulated mowers.

What is claimed is:

1. In a walk-behind lawn mower having a deck with vertical side walls and front and rear ground wheels supporting said deck, said ground wheels having a respective front and rear axles, the improvement comprising a side shield having first and second ends and extending longitudinally along one said deck side wall, pivotal attachment means for securing said first end of the side shield to one of the wheel axles and mounting means on the deck side wall remote from the wheel axles for supporting the second end of said side shield, said second end of the side shield being upwardly extending, said mounting means for the second end of the side shield including means on the deck side wall for receiving and supporting said upwardly extending side shield end for relative vertical movement, and said pivotal attachment means and mounting means cooperating to permit vertical movement of the side shield relative to said deck for enabling passage of said side shield over minor irregularities in the ground over which the mower is operated.

2. The combination of claim 1 in which said side shield extends longitudinally of the mower and is configured substantially in conformity with the shape of the deck side wall.

3. The combination of claim 2 in which said side shield is disposed between the underside of said deck and ground level.

4. The combination of claim 1 including means mounting said ground wheel axles on said deck side wall, said axle mounting means including means for vertically adjusting the riding height of the deck above the ground, and said mounting means for the second end of said side shield being operable to permit longitudinal movement of said second end relative to the deck to provide for lost motion upon adjustment of said deck height.

5. The combination of claim 1 wherein said monting means for the second end of said side shield comprising a bracket extending outwardly from said housing side wall for receiving said second end of the side shield.

6. The combination of claim 5 wherein said bracket extends horizontally from the deck side wall and has a longitudinal slot therein for movably receiving said upwardly extending side shield end.

7. The combination of claim 6 wherein said second end of the shield includes collar means for retaining said side shield end in said bracket slot.

8. The combination of claim 5 wherein said first end of the side shield is mounted on the axle of the rear mower wheels, and said bracket is secured to said deck adjacent to and rearward from the corresponding front wheel.

9. The combination of claim 1 wherein the side shield comprises a rod having a substantially horizontally deposed central portion between said first and second ends.

10. In an articulated riding mower having a sulky upon which an operator rides, said sulky having a pair of ground traction wheels, a walk behind mower disposed forwardly of said sulky, said mower having a deck with side walls and front and rear ground wheels mounted on respective front and rear axles carried by said deck side walls, said sulky being pivotably and detachable connected to the rear of said mower, a power source on said mower, a cutting blade mounted on the underside of said mower deck, transmission means operatively connecting said power source to said blade and to the wheels of said sulky so as to move said sulky and mower in a forward direction, the improvement comprising a side shield having a first and second ends extending longitudinally along one side of said mower deck, pivotal attachment means for securing said first end of the side shield to one of the mower wheel axles and mounting means on the deck side wall remote from the wheel axles for supporting the second end of said side shield, said second end of the side shield being upwardly extending, said mounting means for the second end of the side shield including means on the deck side wall for receiving and supporting said upwardly extending side shield end for relative vertical movement and, said pivotal attachment means and mounting means cooperating to permit vertical movement of said side shield relative to said deck for enabling passage of said side shield over irregularities in the ground over which the sulky and mower are operated.

11. The combination of claim 10 in which said side shield extends longitudinally of the mower and is configured substantially in conformity with the shape of the deck side wall.

12. The combination of claim 11 in which said side shield is disposed between the underside of said deck and ground level.

13. The combination of claim 10 including means mounting said mower wheel axles on said deck side wall, said axle mounting means including means for vertically adjusting the riding height of the deck above the ground, and said mounting means for the second end of said side shield being operable to permit longitudinal movement of the second end of the side shield relative to the deck to provide for lost motion upon adjustment of said deck height.

14. The combination of claim 10 wherein said mounting means for the second end of said side shield comprises a bracket extending outwardly from said housing side wall and said bracket is formed with a longitudinal slot for movably receiving said upwardly extending side shield end.

15. The combination of claim 14 wherein said first end of the side shield is mounted on the axle of the rear mower wheel, and said bracket is secured to said deck adjacent to and rearward from the corresponding front wheel.

* * * * *